Dec. 22, 1953 W. A. PATRICK 2,663,688
PROCESS OF DEOXIDIZING WATER
Filed July 18, 1949 2 Sheets-Sheet 1
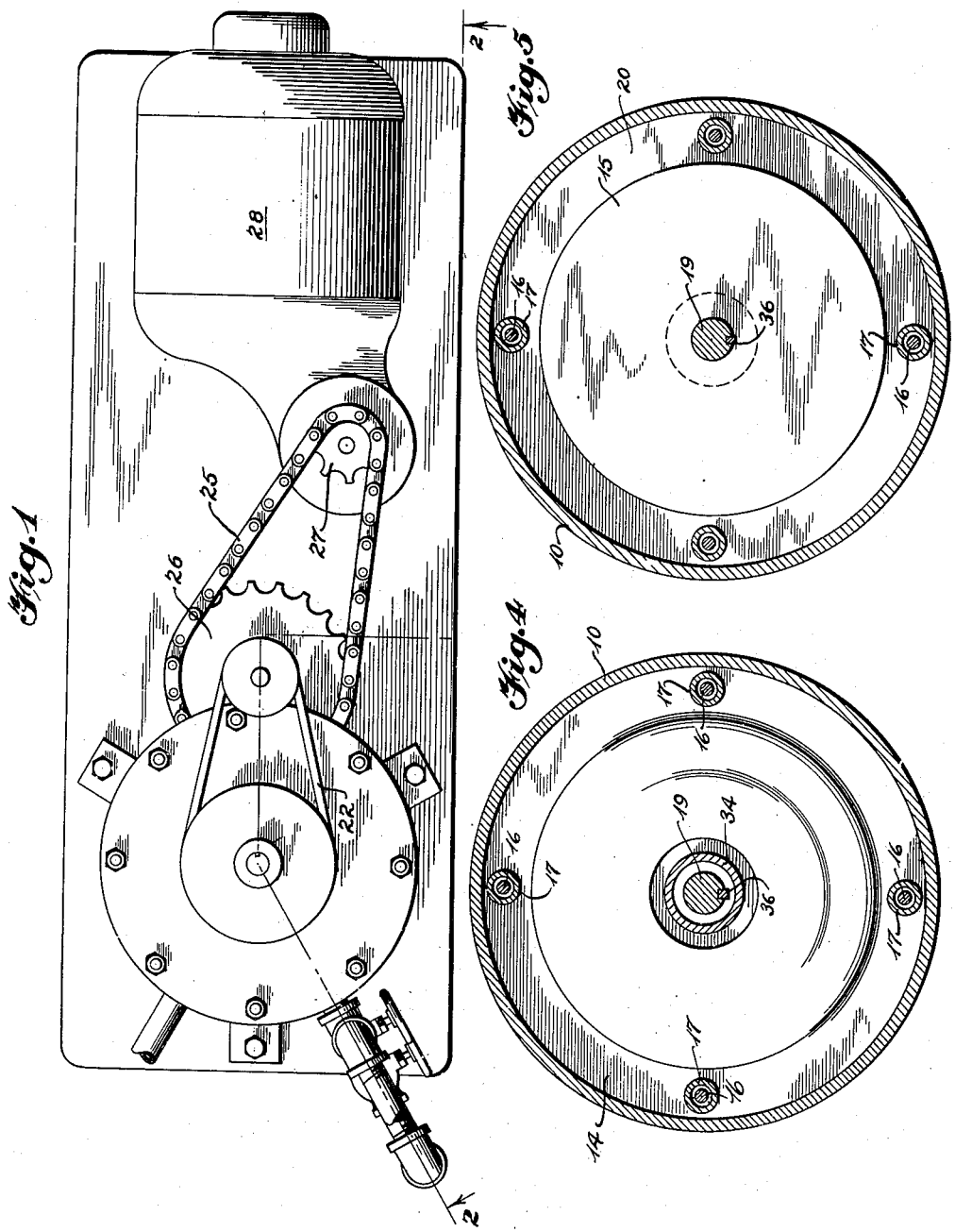
INVENTOR.
Walter A. Patrick
BY
Cushman, Darby & Cushman
ATTORNEYS

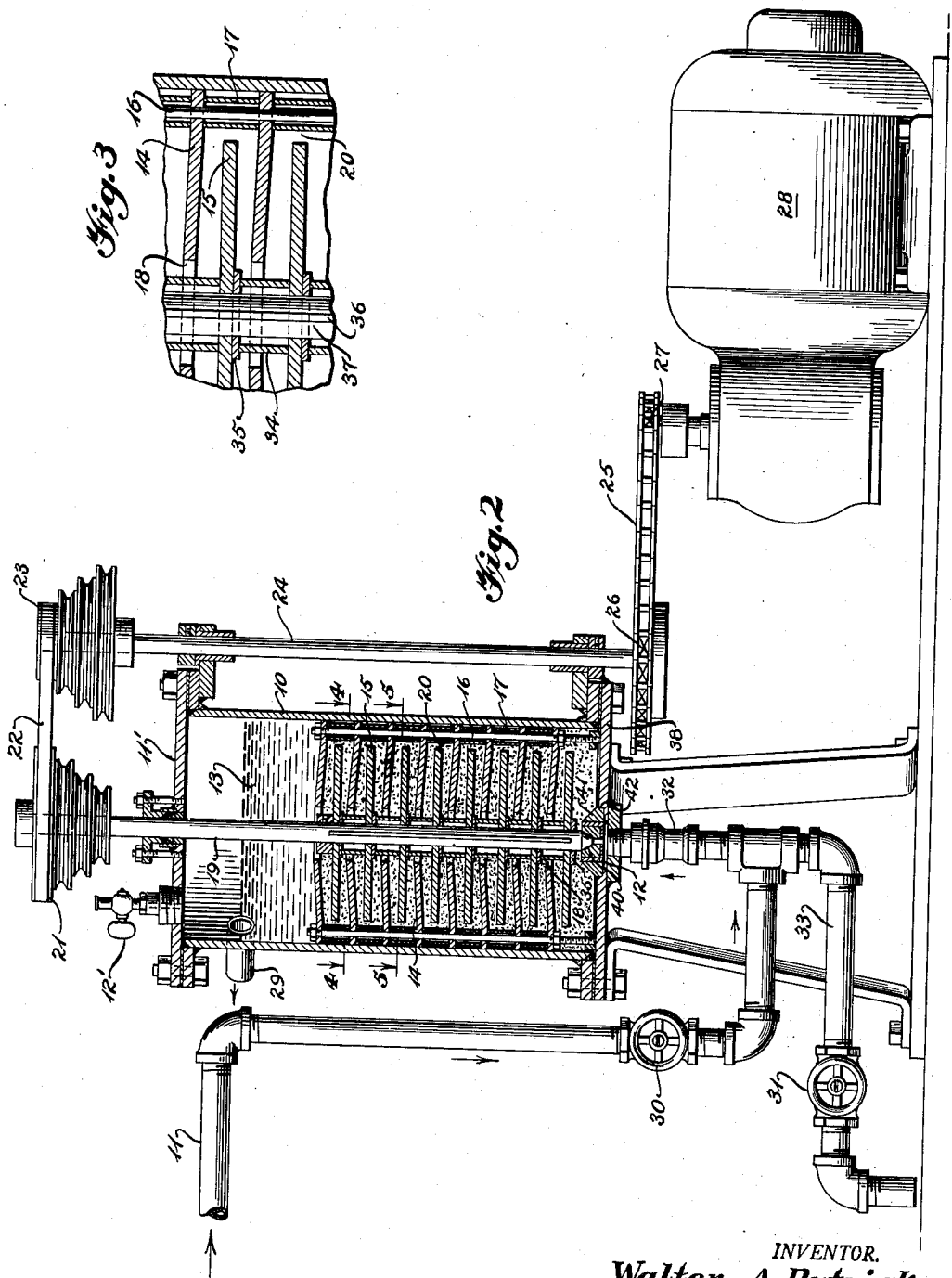

Patented Dec. 22, 1953

2,663,688

UNITED STATES PATENT OFFICE 2,663,688

PROCESS OF DEOXIDIZING WATER

Walter A. Patrick, Baltimore, Md.

Application July 18, 1949, Serial No. 105,419

7 Claims. (Cl. 210—23)

This invention relates to treating water for the purpose of removing occluded oxygen and oxygen in other free and combinable forms whereby oxidation of such products as foods, medicines, chemicals, beverages including carbonated beverages, and processing equipment may be reduced or entirely eliminated.

As regards the products themselves, the removal of potential oxidizing influences from the water appreciably improves the keeping qualities and retention of original taste and flavor by preventing objectionable chemical or physical modification or deterioration. In the case of processing equipment, alleviation of oxidation influences will enable machinery now in use to have a longer life, eliminate delays due to present required frequent cleaning, produce better and uniform quality products, and, also, open to use many available materials which could not heretofore be employed for making processing equipment.

Moreover, the present invention enables processing treatments to be satisfactorily carried out in connection with various products which heretofore had been difficult to process or were of uncertain quality, due to oxidation conditions.

It has been discovered that water may be efficiently and economically deoxidized by intimately contacting the same with a metallic deoxidizing medium maintained in a fluent state. By "fluent state," the freely flowing liquid state is meant. For example, the water may be intimately mixed and caused to traverse through a body of Woods metal (consisting of lead, bismuth, cadmium and tin), wherein the tin reacts with the oxygen in the water to form, first, insoluble stannous oxide, and then the insoluble stannic oxide. These tin oxides precipitate and can be readily filtered from the water and after being deoxidized, are either returned to the liquid bath or body of Woods metal, or reused for the making of Woods metal.

A more preferable procedure is to utilize an intimate mixture or suspension of mercury and pure colloidal iron where, due to the difference in electric potential between the iron and the mercury, the electrical affinity of the iron is increased. The water is intimately mixed and passed through this mixture or colloidal dispersion or suspension of iron in mercury, and the ferrous hydroxide and ferric hydroxide, which are formed, can be readily filtered to provide, as in the case of the Woods metal treatment, a substantially completely deoxidized water.

In the accompanying drawings I have illustrated a preferred apparatus for carrying out the invention wherein Figure 1 is a plan view of the motor drive connection;

Figure 2 is a plan view, partly in section, of the deoxidizer connected to the motor drive;

Figure 3 is a fragmentary detail sectional view of the deoxidizing means;

Figure 4 is a section on the line 4—4 of Figure 2; and

Figure 5 is a section on the line 5—5 of Figure 2.

The deoxidizing equipment may, of course, take various forms, and the invention will be illustrated in the following examples by reference to that shown in the present drawings:

Example I

Woods metal is introduced into the closed deoxidizing chamber 10 having a cover 11' through the valved nipple 12', as shown in Figure 2. The temperature of the metal is maintained such that the metal will be always in a fluent state. Ordinary tap water or, if desired, deaerated water, e. g., distilled water, is introduced through the pipe 11 under pressure to the bottom of the chamber 10, as shown at 12, and this water is intimately mixed with and passed up through the liquid Woods metal 13. Located within the chamber 10 are the fixed dish-shaped baffles 14 which are alternately arranged with rotatable baffles 15. The fixed baffles 14 are dish (concavo-convex) shaped circular plates held together by the rods 16 and intermediate spacers 17, as shown, and are provided with central communicating openings 18, as shown in Figure 3. The movable baffles 15 are circular plates disposed at a slight angle or pitch with respect to the fixed plates and are carried by the shaft 19. The movable plates are of less area than the inside dimension of the chamber 10, as shown in Figures 2 and 3, to provide communicating passageways peripherally of the plates, as shown at 20 in Figure 3. The shaft 19 is rotated by means of the pulley 21 and belt 22 engaging the pulley 23 carried on the shaft 24, which, in turn, rotated by the sprocket chain 25 engaging a sprocket 26 on the shaft 24 while the chain 25 is driven by a suitable sprocket 27 from the motor 28, as shown in Figures 1 and 2. The deoxidized water is constantly removed through the outlet 29, and when it is desired to empty the tank 10, the valve 30 is closed, and the valve 31 is opened, whereupon the liquid in the tank 10 will pass out through the union 32 into the outlet line 33.

Referring to Fig. 3, it will be noted that the rotating plates 15 carried by the shaft 19 are spaced apart centrally of the shaft by spacers 34 carrying suitable plates 35 connected to the undersurface of the movable baffles. The shaft 19 carries longitudinal projections 36 which are keyed into recesses 37 in the baffles 15 and plates 35 to rotate the same, as shown in Figure 3. The cover 11' and bottom 38 of the chamber 11 are detachably bolted in position, as shown in Figure 3. A stuffing box 39 in the cover rotatably receives the shaft 19 which at its lower end is rotatably supported on the cone bushing 40, the water to be oxidized passing up from union 32 into the tank 10 through openings 41 in the bushing mounting 42.

By rotating the shaft 19, and maintaining the temperature of the bath 13 of Woods metal such that the metal is always fluent, namely, above 70° C., the Woods metal and the water are intimately mixed as the water travels continually through the metal bath to the outlet 29. In this treatment, the tin content of the Woods metal becomes oxidized, first, to stannous oxide, and then to stannic oxide, both of which insoluble compounds can be readily filtered and deoxidized by known chemical means whereby the tin may be either returned to the bath 13 or used in the further production of Woods metal.

In the event it is not desired to heat the chamber 10, hot water at a temperature above 70° C. may be introduced into the line 11 which will maintain the Woods metal fluent and the deoxidized water, issuing from the outlet 29, may be further used to heat the incoming water, if desired, by means of any suitable type of well known heat exchanger, not shown.

The operation of Example I is highly efficient in that forty thousand pounds of water or roughly, five thousand gallons, may be deoxidized by the use of only one pound of tin in the Woods metal.

In some cases pure colloidal iron, as prepared by electrolysis, may be mixed or suspended in the Woods metal which then also acts both as a carrier and as a deoxidizer. In this modification, the deoxidizing effect is enhanced, and in addition to the insoluble stannous and stannic oxide precipitate, a precipitate of insoluble ferrous and ferric hydroxide is formed and filtered simultaneously from the deoxidized water.

While I have referred to ordinary tap water as being introduced into the line 11, the water may be preliminarily deaerated as by boiling and distilling, and then introduced into the line 11. The preferable temperature in the chamber 10 is 80° C. which may be maintained by a suitable heating jacket or coil disposed within or about the outside wall of the chamber 10, or, as stated, the water as introduced through the union 32 into the chamber 10 may be heated at a temperature which will maintain the Woods metal constantly fluent. The provision of the alternately fixed and rotating baffles assures intimately mixing, and the water moves upwardly in the chamber 10 to the outlet 28, and for this purpose the water introduced through the line 11 is under such a pressure as to at all times cause an upward flow and prevent the fluent metal from entering the union 32 and line 11. In its travel the water is caused to not only be agitated by the rotating baffles, but also is forced to travel through a tortuous path created by the closely spaced baffles and the peripheral passageways 20 and central passageways 18 respectively provided by the movable and fixed baffles.

Since municipal water supplies frequently are chlorinated, it was thought that this might create a problem, but it has been found that the invention works satisfactorily, notwithstanding that the water is excessively chlorinated, and in this connection, where it is desirable to remove the chlorine before use, this may be readily accomplished by passing the water through a filter bed of activated carbon, connected in a line communicating with the outlet 29 or the inlet 11.

As will be appreciated, the effectiveness of the invention is considerably enhanced by causing a thin layer of water to traverse a tortuous path while it is being agitated, between the closely disposed surfaces of the respective movable and fixed baffle members so that, in effect, a thin layer of water is in a continuous and intimate contact with a relatively large area of the deoxidizing fluent metal.

*Example II*

In this example the apparatus shown in Figure 2 is, likewise, employed, but it is unnecessary, although desirable, that the water be heated or the chamber 10 be heated, as above-described, e. g., to 80° C. The bath 13 is composed of an intimate mixture or suspension of mercury and pure colloidal iron, for example, iron produced electrolytically. By reason of the difference in electric activity of the mercury and the iron, i. e., as indicated by their position in the electromotive series, the chemical activity of the iron is considerably enhanced. Since the mercury is fluent at normal temperature, there is provided a fluent metal deoxidizing bath wherein, as in Example I, a thin layer of water is in intimate and continuous contact with a large area of the mixture.

The constant character of the mixture may be maintained by the introduction of colloidal iron, as required, or the mixture may be circulated through the chamber 10, or, the bath may be used for a definite period of time and then removed and replaced by a bath in which the desired concentration of iron has been produced. At all times, as also true in the case of the Woods metal bath, the deoxidizing body 13 must be fluent, as distinguished from being pasty or thick, or plastic. In other words, the Woods metal body of Example I and the mixture of this example must, at no time, lose their identity as a flowing body, so that at all times there is provided a liquid metal body continually presenting new surfaces to the water which is passing up through the chamber 10 to the outlet 29.

The mercury-iron mixture or suspension preferably consists of mercury containing 1% of iron based on the total weight of the mixture, but the amount of iron may be as great as 2% and as low as .1%

Where the water contains chlorine or excessive chlorine, this may be removed before or after deoxidizing with activated carbon, as above-described, but if the chlorine reacts with the mercury to form calomel, this is not objectionable since the insoluble calomel can be filtered out along with the ferrous and ferric hydroxides which are formed. There is no mercury present in the filtered water as obtained by this operation, even in the case where tap water is heavily chlorinated. In other words, there is no danger of mercury, itself, being produced as a precipitate in the deoxidized water, as mercury cannot exist in solution in the presence of metallic iron.

Preferably, the water introduced at the line 11 has a temperature of about 80° C., although, as stated, this is not necessary, and, in fact, the invention works very successfully at room temperature. The removal of the oxygen takes place rapidly and completely with the formation of some ferrous, but mostly ferric hydroxide, and this latter substance in the case of boiler feed water, need not be removed, but may be allowed to pass into the boiler. Of course, if the presence of ferrous or ferric hydroxide is regarded as undesirable, it may be removed by filtration, as above-indicated.

Where the mixture is used to deoxidize boiler feed water, the iron may be present in the range of .3% to 1.3%, based on the total weight of the mixture.

The iron-mercury mixture or suspension is produced by known methods, e. g., by electrolyzing a ferrous salt solution of suitable concentration and acidity between a mercury cathode and an iron anode.

As will be appreciated, the removal of oxygen from the water will take place as long as any iron is present, and it has been found that one pound of colloidal iron is sufficient to remove the oxygen from eight thousand gallons of water saturated with air at room temperature. This quantity of iron will be formed at a cell voltage of 6 volts with 2.6 kilowatt hours of power. It is, therefore, apparent that the mercury-iron mixture method offers a most economical and practical method for removing oxygen from water.

As stated above, the iron-mercury mixture or suspension may be introduced continually into the chamber 10 where the oxygen removal takes place, and for this purpose a suitable arrangement of valves and pumps capable of operating against the water pressure can be employed. If desired, periodical additions of prepared iron-mercury mixtures accompanied by withdrawals of spent mixture may be used.

As heretofore explained, the provision of the baffle members 14 and 15, with the agitation provided by the rotating members 15 and the tortuous path created by the closely spaced baffles and the passages 18 and 20, assures that a thin layer of water will be intimately mixed with a relatively large volume of the deoxidizing metal, and this will be repeated continually as water is delivered under pressure to the bottom of the chamber 10 and rises through the bath 13 to the outlet 29. In preparing the mixture or suspension of Example II or where iron is introduced into the Woods metal of Example I, the iron is in very finely divided state, e. g., in colloidal form.

In the operation of the apparatus, the water is preferably introduced under pressure into the chamber 10, as described, but a countercurrent treatment wherein the intimate contact is provided, by flowing the metal in one direction and the water in the opposite direction, may be employed.

I claim:

1. A process of obtaining water substantially free of occluded oxygen which comprises deoxidizing the water without decomposing the same by continuously passing the water as a thin layer through a relatively large volume of freely flowing mixture of metals consisting of a member of the group of Woods metal, colloidal iron suspended in mercury, and colloidal iron suspended in Woods metal, and maintaining the temperature of said bath such that said bath is in a freely flowing condition.

2. A process recited in claim 1 in which the freely flowing mixture of metals is a suspension of colloidal iron in Woods metal.

3. A process as recited in claim 1 in which the freely flowing mixture of metals is Woods metal.

4. A process as recited in claim 1 in which the freely flowing mixture of metals is agitated during the passage of the water therethrough.

5. A process as recited in claim 1 in which the insoluble metallic reaction products with oxygen are removed from the water which has been freed from occluded oxygen.

6. A process as recited in claim 1 in which the freely flowing mixture of metals is a suspension of colloidal iron in mercury.

7. A process as recited in claim 6 in which the colloidal iron is present in the proportion of 0.1 to 2.0%, based on the total weight of the suspension.

WALTER A. PATRICK.

References Cited in the file of this patent

UNITED STATES PATENTS

| Number | Name | Date |
|---|---|---|
| 556,324 | Kendrick | Aug. 25, 1896 |
| 668,820 | Jones | Feb. 26, 1901 |
| 1,231,707 | Christensen | July 3, 1917 |
| 1,469,007 | Meyer et al. | Sept. 25, 1923 |
| 1,553,473 | Poma et al. | Sept. 15, 1925 |
| 1,793,465 | Coahran | Feb. 24, 1931 |
| 1,845,128 | Coahran | Feb. 16, 1932 |
| 1,927,027 | Foulds | Sept. 19, 1933 |
| 1,954,796 | Buss et al. | Apr. 17, 1934 |
| 2,098,431 | Partridge | Nov. 9, 1937 |
| 2,150,608 | Olier | Mar. 14, 1939 |
| 2,311,697 | Samiran | Feb. 23, 1943 |
| 2,336,045 | Taylor | Dec. 7, 1943 |

OTHER REFERENCES

Roscoe et al., Treatise on Chemistry, vol. II, 1913, MacMillan, London, pages 1002–3.